United States Patent
Sun et al.

(10) Patent No.: US 11,421,816 B2
(45) Date of Patent: Aug. 23, 2022

(54) ANGLE ADJUSTMENT MECHANISM OF OPTICAL INSTRUMENT

(71) Applicant: HUANIC CORPORATION, Shaanxi (CN)

(72) Inventors: Jianhua Sun, Shaanxi (CN); Meng Zhao, Shaanxi (CN)

(73) Assignee: HUANIC CORPORATION

( * ) Notice: Subject to any disclaimer, the term of this patent is extended or adjusted under 35 U.S.C. 154(b) by 0 days.

(21) Appl. No.: 17/284,710

(22) PCT Filed: Nov. 22, 2019

(86) PCT No.: PCT/CN2019/120406
§ 371 (c)(1),
(2) Date: Apr. 12, 2021

(87) PCT Pub. No.: WO2020/108413
PCT Pub. Date: Jun. 4, 2020

(65) Prior Publication Data
US 2021/0341093 A1    Nov. 4, 2021

(30) Foreign Application Priority Data
Nov. 27, 2018   (CN) .......................... 201811426718.1

(51) Int. Cl.
*G02B 7/02* (2021.01)
*F16M 11/18* (2006.01)
(Continued)

(52) U.S. Cl.
CPC .......... *F16M 11/18* (2013.01); *F16M 11/045* (2013.01); *F16M 11/046* (2013.01);
(Continued)

(58) Field of Classification Search
None
See application file for complete search history.

(56) References Cited

U.S. PATENT DOCUMENTS 5,033,219 A * 7/1991 Johnson ..................... F41G 1/35
42/126
5,694,713 A * 12/1997 Paldino ..................... F41G 1/35
42/114
(Continued)

FOREIGN PATENT DOCUMENTS

CH          654655 A5 *   2/1986
CN       101387731 A      3/2009
(Continued)

OTHER PUBLICATIONS

International Search Report regarding corresponding PCT App. No. PCT/CN2019/120406; dated Feb. 21, 2020.
(Continued)

*Primary Examiner* — Gabriel J. Klein
(74) *Attorney, Agent, or Firm* — Dickinson Wright PLLC

(57) ABSTRACT

An angle adjustment mechanism includes a hollow cylindrical fine adjustment seat (1), a hollow cavity of the fine adjustment seat (1) are provided with a tapered fine adjustment screw (3) and a mounting seat (2) having a tapered surface (201), the tapered fine adjustment screw (3) and the mounting seat (2) are opposed to each other along the axial direction, the tapered surface (201) of the mounting seat (2) is provided with four strip-shaped planes (202) evenly spaced in the circumferential direction, two adjacent strip-shaped planes (202) are overlapped with the tapered surfaces of two tapered fine adjustment screws (3) respectively, the tapered fine adjustment screw (3) can move forward or backward in a cavity formed by an inner wall of the fine adjustment seat (1) and the tapered surface (201) of the mounting seat (2) along a strip-shaped plane (202) that coincides with the tapered fine adjustment screw (3).

8 Claims, 8 Drawing Sheets

(51) Int. Cl.
*F16M 11/04* (2006.01)
*F41G 1/033* (2006.01)
*F41G 1/16* (2006.01)
*F41G 1/26* (2006.01)
*F16M 11/14* (2006.01)
*G02B 27/20* (2006.01)

(52) U.S. Cl.
CPC ............ *F16M 11/14* (2013.01); *F41G 1/033* (2013.01); *F41G 1/16* (2013.01); *F41G 1/26* (2013.01); *G02B 7/023* (2013.01); *G02B 27/20* (2013.01)

(56) References Cited

U.S. PATENT DOCUMENTS

| | | | | |
|---|---|---|---|---|
| 5,706,600 | A | * | 1/1998 | Toole ........................ F41G 1/35 362/114 |
| 5,784,823 | A | * | 7/1998 | Chen ...................... F41G 11/001 362/110 |
| 6,295,754 | B1 | | 10/2001 | Otteman |
| 7,331,137 | B2 | * | 2/2008 | Hsu ....................... F41G 11/003 42/114 |
| 7,726,061 | B1 | * | 6/2010 | Thummel ................. F41G 1/35 42/117 |
| 9,823,045 | B2 | | 11/2017 | Chu et al. |
| 2007/0035854 | A1 | * | 2/2007 | Haefele .................. G02B 7/023 359/811 |
| 2017/0075068 | A1 | | 3/2017 | Beresnev |

FOREIGN PATENT DOCUMENTS

| | | |
|---|---|---|
| CN | 104712917 A | 6/2015 |
| CN | 108844405 A | 11/2018 |
| CN | 209484180 U | 10/2019 |
| JP | 2000019380 A | 1/2000 |
| JP | 2005070417 A | 3/2005 |
| JP | 2007052335 A | 3/2007 |

OTHER PUBLICATIONS

Notice of Allowance regarding corresponding JP App. No. 2021-519792; dated Apr. 26, 2022.

* cited by examiner

ANGLE ADJUSTMENT MECHANISM OF OPTICAL INSTRUMENT

CROSS-REFERENCE TO RELATED APPLICATIONS

The present application claims priority as the National Stage to International Application No. PCT/CN2019/120406, filed Nov. 22, 2019, which claims priority to the Chinese patent application NO. 201811426718.1, filed on Nov. 27, 2018, both of which are incorporated herein by reference in their entirety.

TECHNICAL FIELD

The disclosure belongs to the technical field of laser measurement, and specifically relates to an angle adjustment mechanism of an optical instrument.

BACKGROUND

The adjustment of the direction of the emitted light of the existing laser pointer, laser sight, optical sight and other optical instruments mainly relies on the horizontal adjustment screw and the vertical adjustment screw installed on the housing, to realize the adjustment of the left and right angle or the up and down angle of the optical instrument body, so as to realize the adjustment of the angle of the emitted light. However, this structure is generally suitable for larger-volume sights, not suitable for smaller volume optical instruments, mainly because the structure is complex and the adjustment takes up a lot of space.

SUMMARY OF THE DISCLOSURE

For this, the present disclosure provides an angle adjustment mechanism of an optical instrument, includes a hollow cylindrical fine adjustment seat, a hollow cavity of the fine adjustment seat are provided with a tapered fine adjustment screw and a mounting seat having a tapered surface, the tapered fine adjustment screw and the mounting seat are opposed to each other along the axial direction, the tapered surface of the mounting seat is provided with four strip-shaped planes evenly spaced in the circumferential direction, two adjacent strip-shaped planes are overlapped with the tapered surfaces of two tapered fine adjustment screws respectively, the tapered fine adjustment screw can move forward or backward in a cavity formed by an inner wall of the fine adjustment seat and the tapered surface of the mounting seat along a strip-shaped plane that coincides with the tapered fine adjustment screw.

Further, the angle adjustment mechanism of an optical instrument further includes a fine adjustment elastic member, the fine adjustment elastic member is a Π shape structure or a ∇ shape structure formed by splicing an elastic arc elastic piece and two spring pressing pieces with arc-shaped protrusions, the elastic arc elastic piece is clamped at a edge of one end of the fine adjustment seat, two arc-shaped protrusions of the two spring pressing pieces abut on a remaining two strip-shaped planes respectively.

Preferably, the spring pressing piece is wave-shaped, a wave crest close to the elastic arc elastic piece is an arc-shaped protrusion, and the wave crest where the arc-shaped protrusion located faces a central axis of the elastic arc elastic piece.

Further, a cylindrical wall of the fine adjustment seat is provided with two strip openings which are respectively communicated with the hollow cavity along the axial direction, the arc-shaped protrusion of the spring pressing piece passes through the strip opening and contacts the strip-shaped plane.

Preferably, one end of the fine adjustment seat is open, and the elastic arc elastic piece is clamped to an open end, the other end of the fine adjustment seat is provided with an end cover, the end cover is provided with a round hole for passing through the tapered fine adjustment screw, and a center of the end cover is provided with a center hole for emitted light.

Further, the mounting seat includes a circular truncated section, a cylindrical transition section and a drum section, the circular truncated section is with gradually increasing diameters from left to right, the four strip-shaped planes are arranged on the tapered surface of the circular truncated section oppositely and in parallel in pairs, one of the strip-shaped planes is provided with a positioning hole.

Preferably, a drum surface of the drum section is provided with a groove for accommodating a limiting member, and the limiting member is located between the drum section of the mounting seat and an inner wall of the open end of the fine adjustment seat.

Preferably, the tapered fine adjustment screw is a hexagon socket countersunk head conical screw.

The present disclosure will be further described in detail below in conjunction with the accompanying drawings.

DETAILED DESCRIPTION

Figure 1:
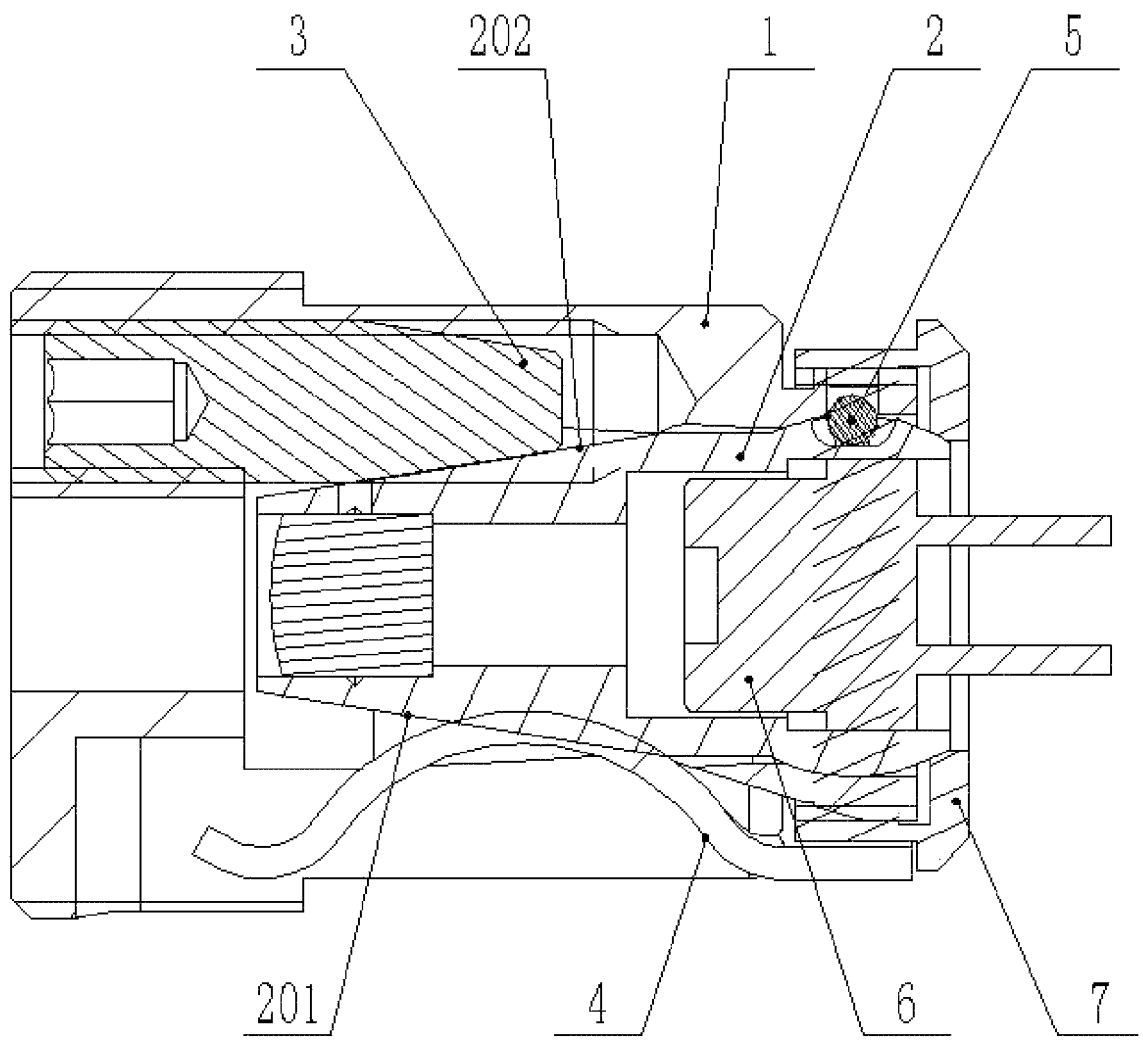
FIG. 1 is a cross-sectional view of an angle adjustment mechanism of an optical instrument.

The embodiments of the present disclosure are illustrated by specific embodiments as following, and those skilled in the art can easily understand other advantages and effects of the present disclosure from the content disclosed in this specification.

It should be noted that in the present disclosure, up, down, left, and right in the figures are regarded as the up, down, left, and right of the angle adjustment mechanism of the optical instrument described in this specification.

Exemplary embodiments of the present disclosure will now be described with reference to the accompanying drawings. However, the present disclosure can be implemented in many different forms and is not limited to the embodiments described here. These embodiments are provided to fully and completely disclose the present disclosure, and fully convey the scope of the present disclosure to those skilled in the art. The terms in the exemplary embodiments shown in the drawings do not limit the present disclosure. In the drawings, the same units/elements use the same reference signs.

Unless otherwise specified, the terms (including scientific and technological terms) used herein have the usual meanings to those skilled in the art. In addition, it is understandable that the terms defined in commonly used dictionaries should be understood as having consistent meanings in the context of their related fields, and should not be understood as idealized or overly formal meanings.

It should be particularly noted that the angle adjustment mechanism of the optical instrument provided by the present disclosure is suitable for all optical instruments that need to adjust the direction of the optical axis, such as optical sights, internal red dot sights, laser pointers, and structures that require the mechanical axis to be coaxial with the optical axis. All the following embodiments use a laser module as an example, but are not limited to this.

The First Embodiment

Figure 5:
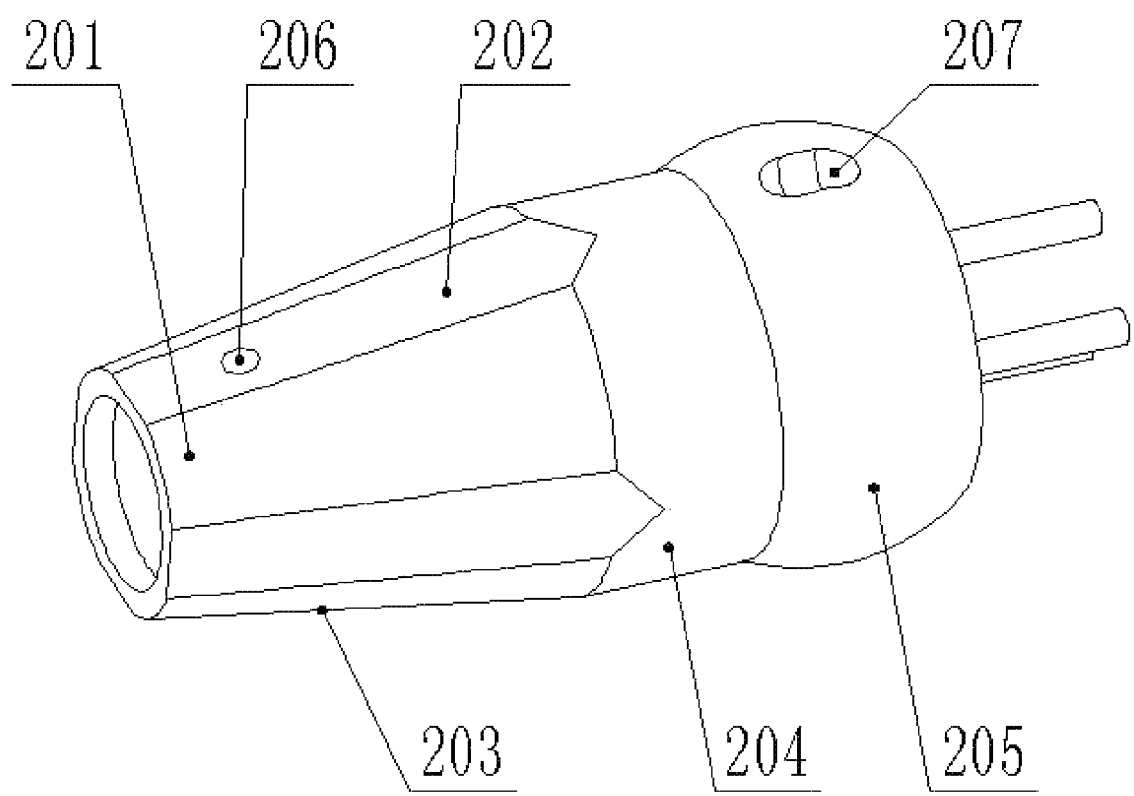
FIG. 5 is a structural diagram of the mounting seat.

This embodiment provides an angle adjustment mechanism for an optical instrument, as shown in FIG. 1, which includes a hollow cylindrical fine adjustment seat 1. The hollow cavity of the fine adjustment seat 1 is provided with a tapered fine adjustment screw 3 and a mounting seat 2 having a tapered surface 201, the tapered fine adjustment screw 3 and the mounting seat 2 are opposed to each other along the axial direction. As shown in FIG. 5, the tapered surface 201 of the mounting seat 2 is provided with four strip-shaped planes 202 evenly spaced in the circumferential direction. The two adjacent strip-shaped planes 202 are overlapped with the tapered surfaces of two tapered fine adjustment screws 3 respectively. In addition, the tapered fine adjustment screw 3 can move forward or backward in the cavity formed by the inner wall of the fine adjustment seat 1 and the tapered surface 201 of the mounting seat 2 along the strip-shaped plane 202 that coincides with the tapered fine adjustment screw 3.

Specifically, as shown in FIG. 1, the fine adjustment seat 1 is divided into a front section and a rear section. The tapered fine adjustment screw 3 is located in the front section cavity of the fine adjustment seat 1. The mounting seat 2 is located in the rear section cavity of the fine adjustment seat 1. The tapered surface of the tail of the tapered fine adjustment screw 3 is overlapped with the strip-shaped plane 202 on the tapered surface 201 of the mounting seat 2. The tail end of the tapered fine adjustment screw 3 forms a space with the outer wall of the mounting seat 2 and the cavity of the fine adjustment seat 1. The tapered fine adjustment screw 3 can move forward or backward in the space along the strip-shaped plane 202. The angle of the laser 6 can be adjusted by moving forward or backward of the tapered fine adjustment screw 3.

In a preferred embodiment, the mounting seat 2 has a tapered structure as shown in FIG. 5. Four strip-shaped planes 202 are provided on the tapered surface of the front section of the tapered structure. The longitudinal section is carried out in the direction shown in FIG. 5, in the longitudinal section, the four strip-shaped planes 202 and the center of the mounting seat 2 are cross-shaped.

In this embodiment, the tapered surface 201 of the mounting seat 2 is provided with planes, and preferably strip-shaped planes 202 as shown in FIG. 5. The reason is that when the tapered fine adjustment screw 3 moves along the strip-shaped plane 202, the planes can reduce friction and make the tapered fine adjustment screw 3 easy to push, which saves effort and can accurately adjust the angle of the laser 6.

The angle adjustment mechanism of the optical instrument provided in this embodiment is applicable to all optical sights, internal red dot sights, laser pointers, and structures that require the mechanical axis to be coaxial with the optical axis. Taking the laser module as an example, the working process or working principle of the angle adjustment mechanism of the optical instrument is as follows:

If the direction of the emitted light needs to be adjusted, put the tapered fine adjustment screw 3 into the fine adjustment seat 1, as shown in FIG. 1. Make the tapered fine adjustment screw 3 overlap the strip-shaped plane 202 of the mounting seat 2, then use a wrench to screw the tapered fine adjustment screw 3, and push the tapered fine adjustment screw 3 to move forward along the strip-shaped plane 202 of the mounting seat 2 abutting with the tapered surface of the tapered fine adjustment screw 3. The mounting seat 2 is squeezed and moves downward as shown in FIG. 1. Since the laser 6 is installed in the mounting seat 2, the mounting seat 2 moves downwards and the laser 6 move downwards accordingly, thereby realizing the fine adjustment of the laser 6.

The angle adjustment mechanism of the optical instrument disclosed in this embodiment adopts a manner in which the tapered surface of the tapered fine adjustment screw and the plane on the mounting seat overlap each other. When pushing the tapered fine adjustment screw, the tapered fine adjustment screw can advance or retreat along the plane on the mounting seat, and the speed of forward and backward can be controlled. Thereby the angle of the main body of the optical instrument (such as a laser) can be precisely adjusted. This structure is especially suitable for the adjustment of the angle of the emitted light of smaller optical instruments. Through pushing the tapered fine adjustment screw, the optical instrument main body (such as laser) can be fine adjusted in the horizontal and vertical directions. Thereby the adjustment of the left and right angle or the up and down angle of the main body of the optical instrument (such as a laser) is realized, so as to realize the adjustment of the angle of the emitted light.

The Second Embodiment

This embodiment provides an angle adjustment mechanism for an optical instrument, as shown in FIG. 1, which includes a hollow cylindrical fine adjustment seat 1. The hollow cavity of the fine adjustment seat 1 are provided with a tapered fine adjustment screw 3 and a mounting seat 2 having a tapered surface 201, the tapered fine adjustment screw 3 and a mounting seat 2 are opposed to each other along the axial direction. As shown in FIG. 5, the tapered surface 201 of the mounting seat 2 is provided with four strip-shaped planes 202 evenly spaced in the circumferential direction. The two adjacent strip-shaped planes 202 are overlapped with the tapered surfaces of two tapered fine adjustment screws 3 respectively. In addition, the tapered fine adjustment screw 3 can move forward or backward in the cavity formed by the inner wall of the fine adjustment seat 1 and the tapered surface 201 of the mounting seat 2 along the strip-shaped plane 202 that coincides with the tapered fine adjustment screw 3.

Figure 2:
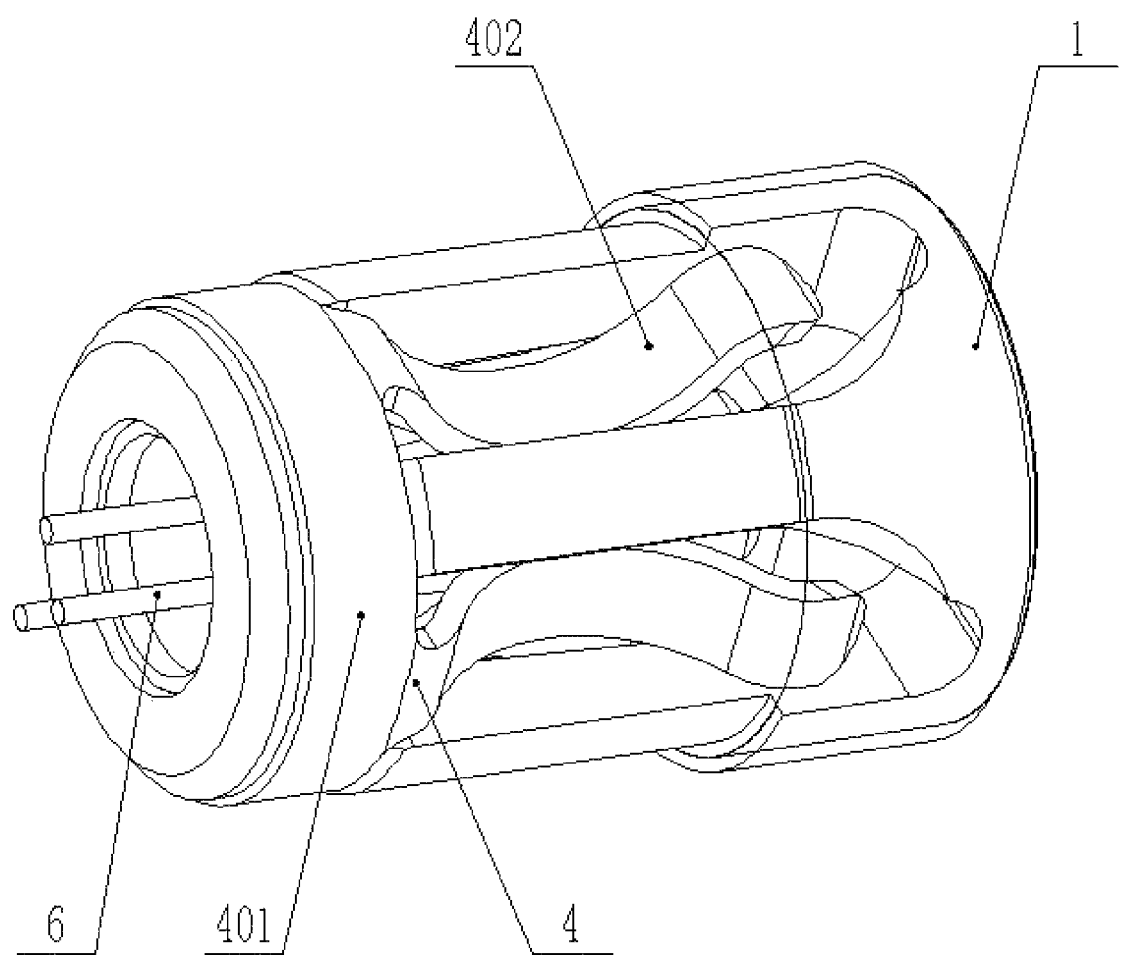
FIG. 2 is a perspective view of an angle adjustment mechanism of an optical instrument.
Figure 6:
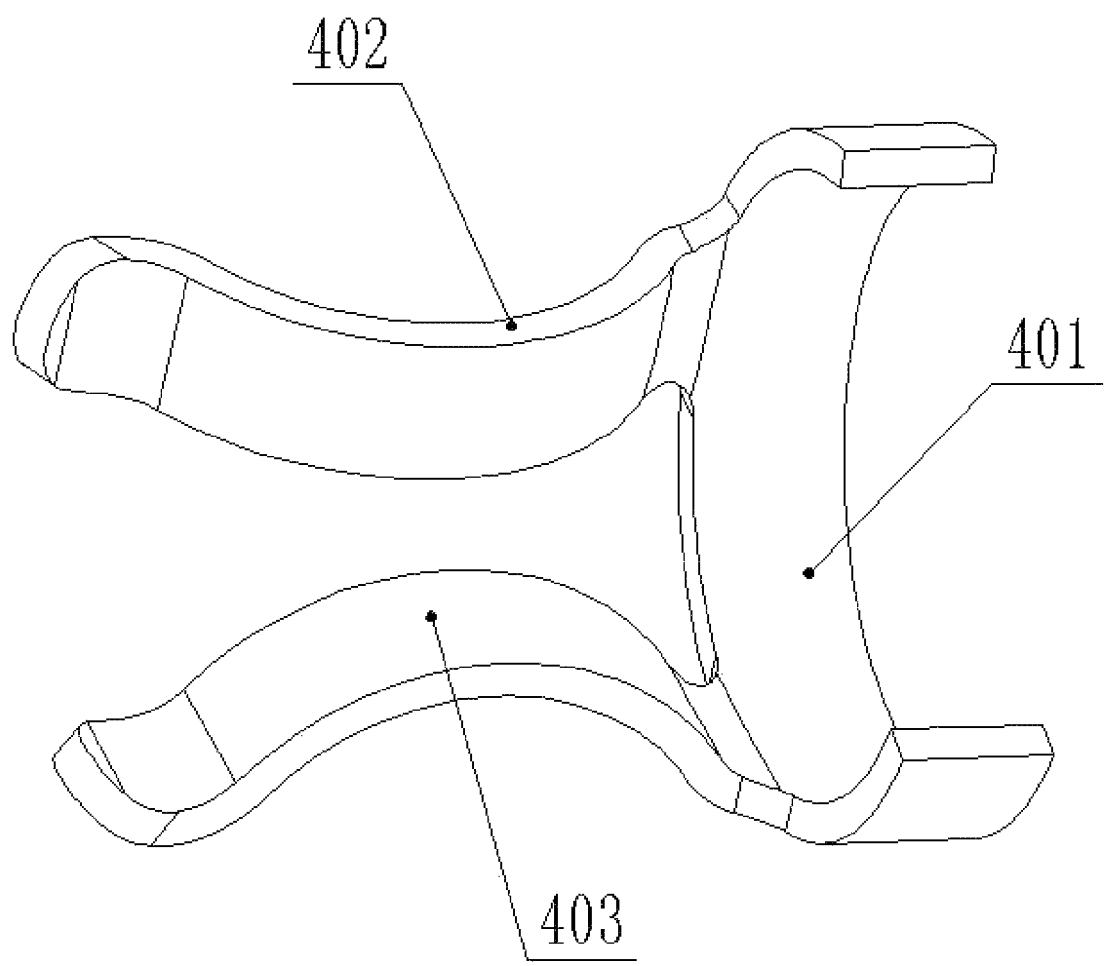
FIG. 6 is a structural diagram 1 of the fine adjustment elastic member.

The angle adjustment mechanism of the optical instrument in this embodiment further includes a fine adjustment elastic member 4. As shown in FIG. 6, the fine adjustment elastic member 4 is a Π shape structure or a ∇ shape structure formed by splicing an elastic arc elastic piece 401 and two spring pressing pieces 402 with arc-shaped protrusions 403. As shown in FIG. 2, the elastic arc elastic piece 401 is clamped at the edge of one end of the fine adjustment seat 1. As shown in FIG. 1, the two arc-shaped protrusions 403 of the two spring pressing pieces 402 abut on the remaining two strip-shaped planes 202 respectively.

This embodiment is a preferred embodiment of the first embodiment, and the parts in this embodiment that are similar to the first embodiment will not be repeated here.

Compared with the first embodiment, this embodiment adds a fine adjustment elastic member 4. The fine adjustment elastic member 4 can be connected to the fine adjustment seat 1 in a snap-fit manner. Specifically, the elastic arc elastic piece 401 is engaged with the end edge of the rear section of the fine adjustment seat 1. As shown in FIG. 2, the arc-shaped protrusions 403 in the middle of the two spring pressing pieces 402 abut against the strip-shaped plane 202 of the mounting seat 2.

For example, the four strip-shaped planes 202 are sequentially numbered as strip-shaped plane A, strip-shaped plane B, strip-shaped plane C, and strip-shaped plane D. In a preferred embodiment, the strip-shaped plane A and the strip-shaped plane B are respectively overlapped with the tapered surfaces of two tapered fine adjustment screws 3. The strip-shaped plane C and the strip-shaped plane D respectively abut the two arc-shaped protrusions 403 of the two spring pressing pieces 402. When screwing the tapered fine adjustment screw 3, push the tapered fine adjustment screws 3 to move advance along the strip-shaped plane A and the strip-shaped plane B that abut the tapered surface of tapered fine adjustment screws 3, and the mounting seat 2 is squeezed, as shown in FIG. 1, and moves downward. The strip-shaped plane C and the strip-shaped plane D respectively squeeze the arc-shaped protrusions 403 abutting them. Since the spring pressing pieces 402 where the arc-shaped protrusions 403 are located have elastic structure, they will offset part of the squeezing force and slow down the downward movement of the mounting seat 2. That is, the position of the mounting seat 2 is limited to realize the precise adjustment of the laser 6 in the mounting seat 2.

In particular, the strip-shaped plane A and the strip-shaped plane B form 90 degrees. Therefore, the two tapered fine adjustment screws 3 matched with them form 90 degrees to each other. When the two tapered fine adjustment screws 3 that form 90 degrees to each other are pushed to move, the horizontal and vertical movement of the laser 6 can be realized, reflected in FIG. 1, that is, the up and down and back and forth movement of the laser 6 (perpendicular to the paper surface), that is, the angle adjustment of the laser 6 is realized.

In a preferred embodiment, the fine adjustment elastic member 4 is a Π shape structure formed by splicing an elastic arc elastic piece 401 and two spring pressing pieces 402 with arc-shaped protrusions 403. The spring pressing piece 402 has a wave shape. As shown in FIG. 6, the wave crest close to the elastic arc elastic piece 401 is an arc-shaped protrusion 403. In addition, the wave crest where the arc-shaped protrusion 403 located faces the central axis of the elastic arc elastic piece 401.

Figure 7:
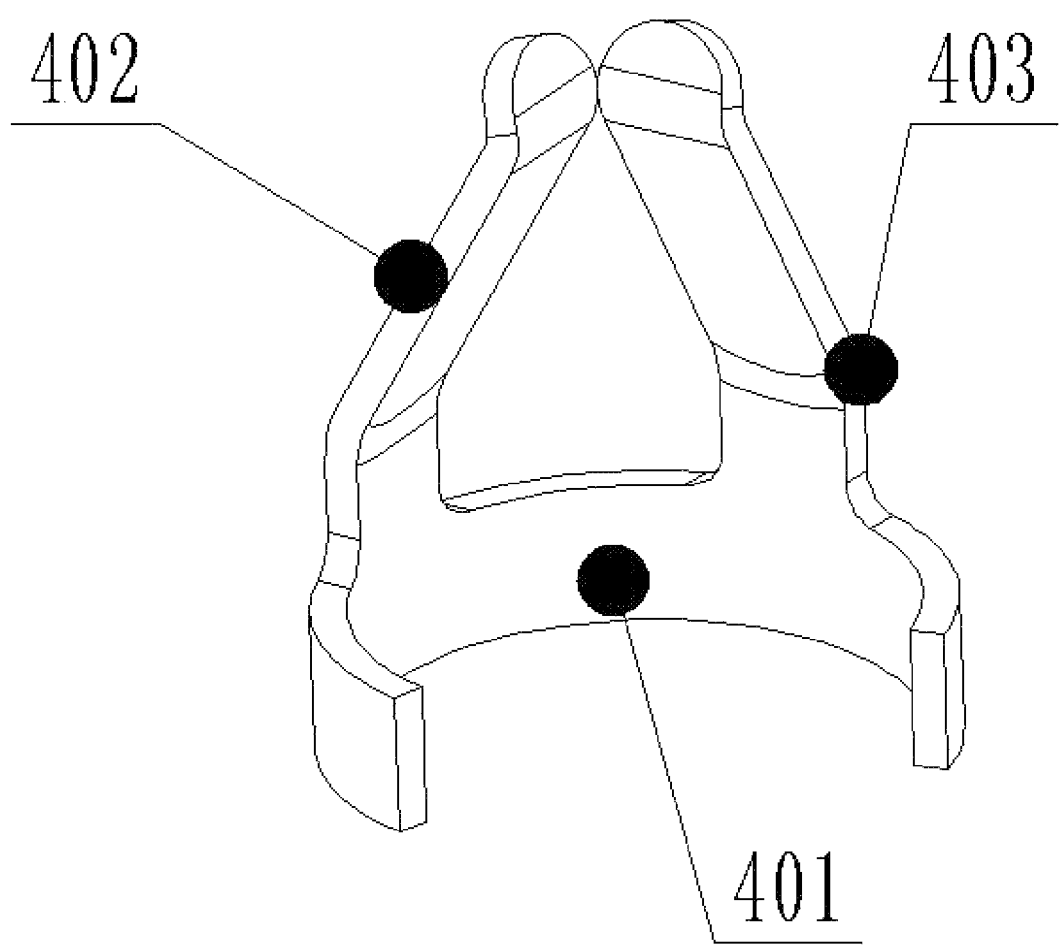
FIG. 7 is a structural diagram 2 of the fine adjustment elastic member.
Figure 8:
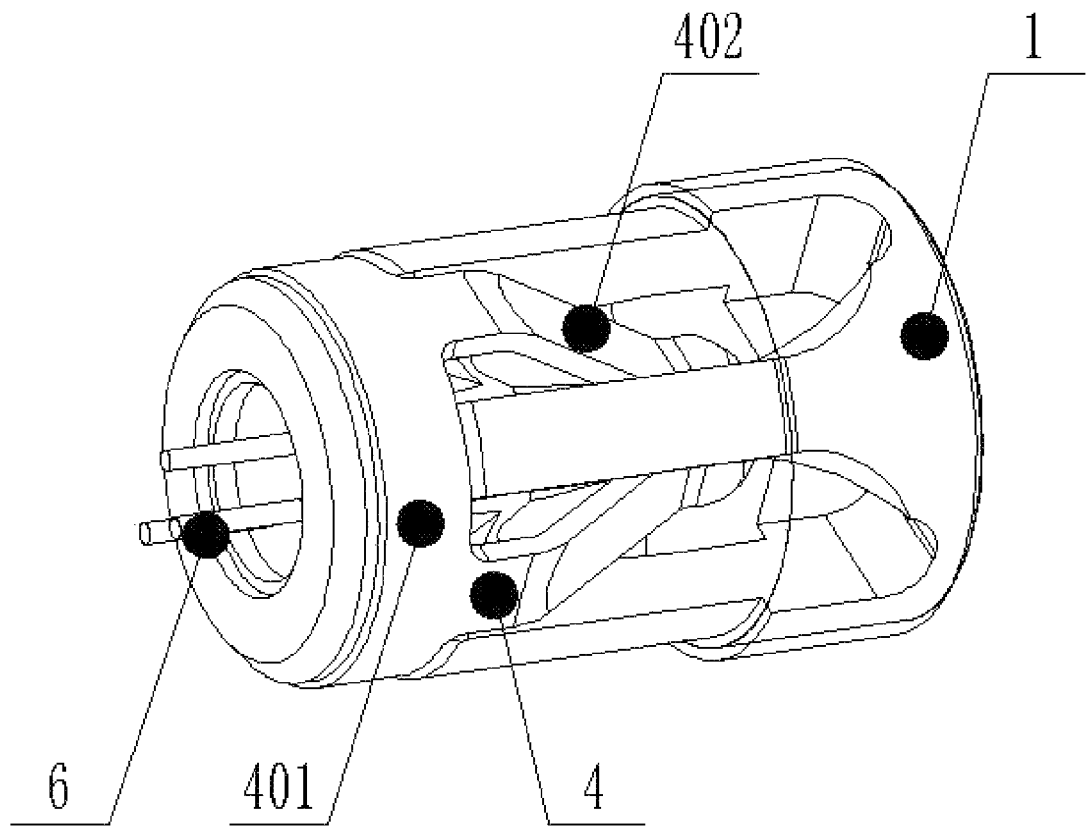
FIG. 8 is a structural diagram of an angle adjustment mechanism having the structure of the fine adjustment elastic member shown in FIG. 7.

In a preferred embodiment, the fine adjustment elastic member 4 is a ∇ shape structure formed by splicing an elastic arc elastic piece 401 and two spring pressing pieces 402 with arc-shaped protrusions 403. As shown in FIG. 7, the same ends of the two spring pressing pieces 402 are connected to the middle of the elastic arc elastic piece 401, and the two spring pressing pieces 402 are symmetrical about the midpoint of the elastic arc elastic piece 401. The other ends of the two spring pressing pieces 402 are in contact, that is, the two spring pressing pieces 402 have a V shape as shown in FIG. 7. The ∇ shape fine adjustment elastic member 4 is installed on the fine adjustment seat 1 as shown in FIG. 8.

The Third Embodiment

Figure 3:
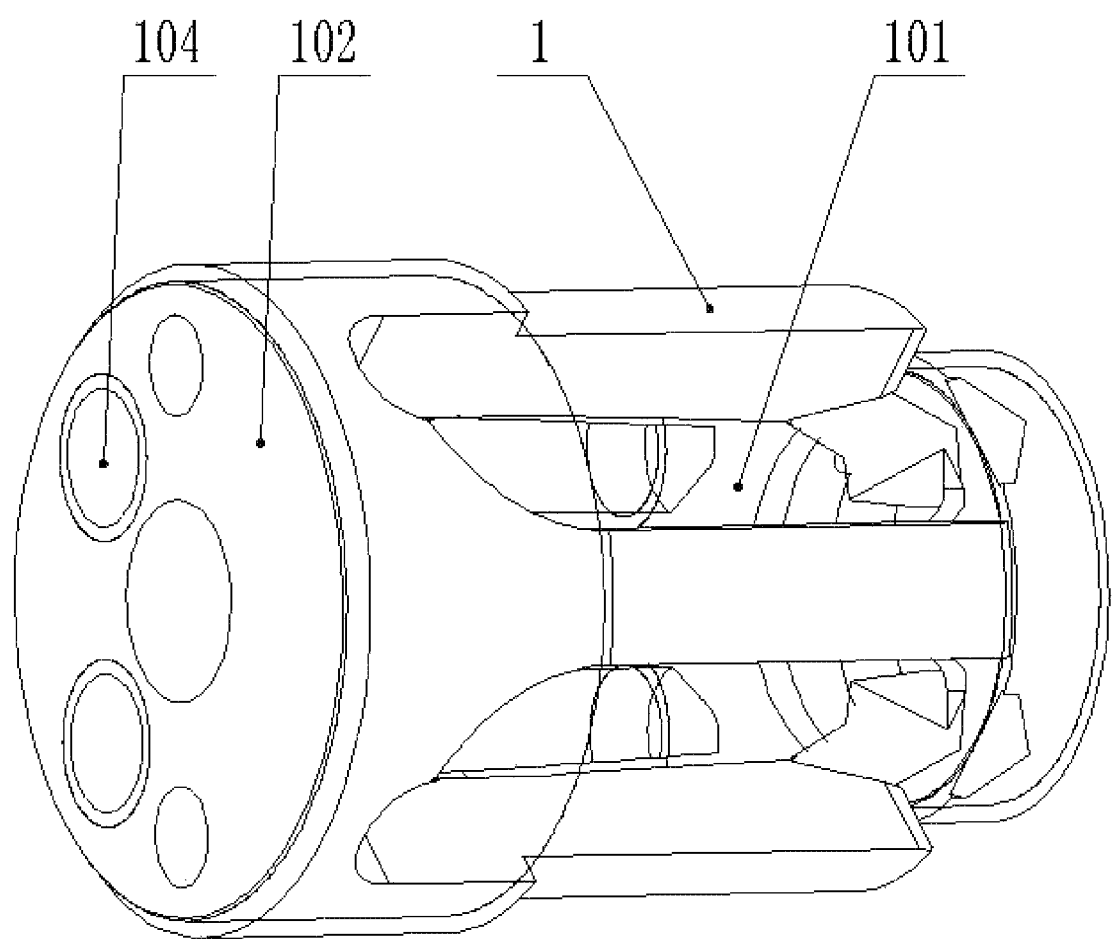
FIG. 3 is a structural diagram 1 of the fine adjustment seat.
Figure 4:
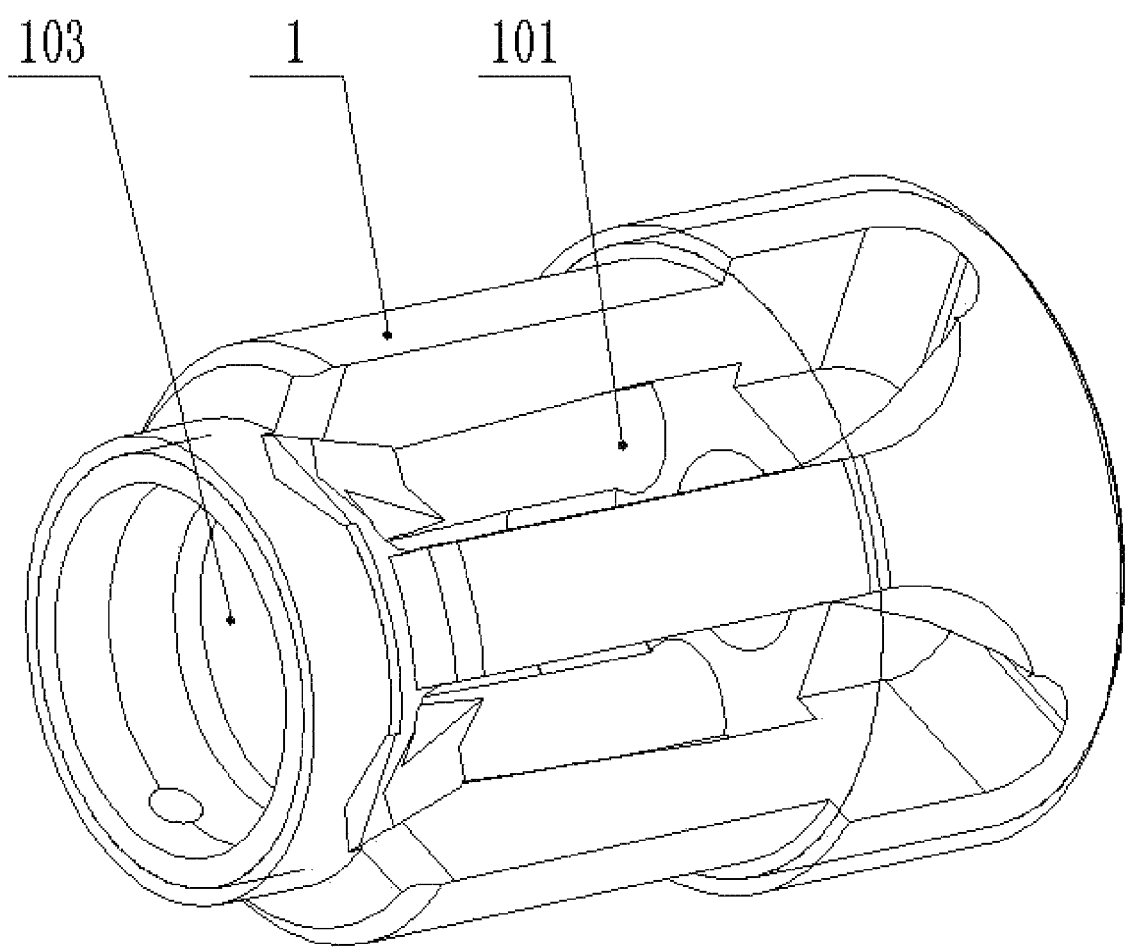
FIG. 4 is a structural diagram 2 of the fine adjustment seat.

On the basis of the second embodiment, as shown in FIGS. 3 and 4, in order to facilitate the abutment between the spring pressing piece 402 and the strip-shaped plane 202 on the mounting seat 2, the cylindrical wall of the fine adjustment seat 1 is axially provided with two strip openings 101 communicating with the hollow cavity, and the arc-shaped protrusion 403 of the spring pressing piece 402 passes through the strip opening 101 and contacts the strip-shaped plane 202.

Optionally, one end of the fine adjustment seat 1 is open, and the elastic arc elastic piece 401 is clamped to the open end 103. The other end of the fine adjustment seat 1 is provided with an end cover 102, the end cover 102 is provided with round holes 104 for passing through the tapered fine adjustment screws 3, and the center of the end cover 102 is provided with a center hole for emitted light.

The Fourth Embodiment

On the basis of the third embodiment, as shown in FIG. 5, as a preference, the mounting seat 2 includes a circular truncated section 203, a cylindrical transition section 204 and a drum section 205, the circular truncated section 203 is with gradually increasing diameters from left to right. The four strip-shaped planes 202 are arranged on the tapered surface 201 of the circular truncated section 203 oppositely and in parallel in pairs. In order to facilitate the manufacturing process, one of the strip-shaped planes 202 is provided with a positioning hole 206.

As shown in FIG. 5, the drum surface of the drum section 205 is provided with a groove 207 for accommodating the limiting member 5, and the limiting member 5 is located between the drum section 205 of the mounting seat 2 and the inner wall of the open end 103 of the fine adjustment seat 1.

When assembling the angle adjustment mechanism of the optical instrument, the laser 6 is put into the mounting seat 2 from the open end 103 of the fine adjustment seat 1, and the mounting seat 2 is secured by the laser pressing ring 7 at the open end 103. As shown in FIG. 1, the limiting member 5 is located between the laser pressing ring 7 and the mounting seat 2, and plays a role of limiting the mounting seat 2 to prevent the mounting seat 2 from sliding out of the fine adjustment seat 1 when the tapered fine adjustment screw 3 pushes the mounting seat 2 to the right (the direction in FIG. 1).

It is worth mentioning that the limiting member 5 is a limiting ball or a limiting cylinder. In this embodiment, a limiting ball is preferred, but it is not limited to this.

The Fifth Embodiment

Figure 9:
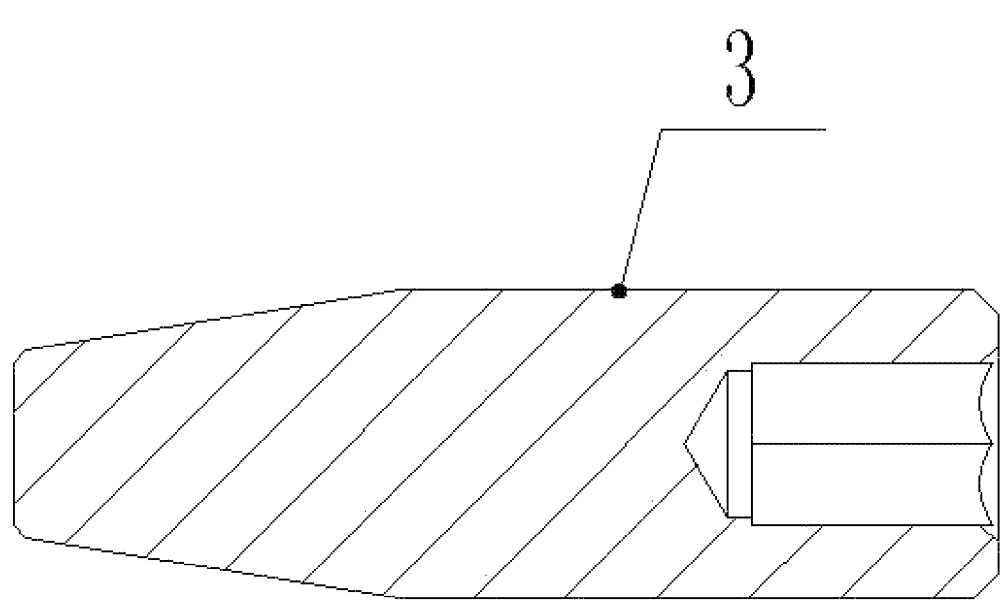
FIG. 9 is a structural diagram of a tapered fine adjustment screw.

Preferably, in order to facilitate the use of a wrench to screw the tapered fine adjustment screw 3, as shown in FIG. 9, the tapered fine adjustment screw 3 is a hexagon socket countersunk head conical screw.

In particular, the specific applications of the angle adjustment mechanism of the optical instrument disclosed in the present disclosure are as follows:

The method for adjusting the installation angle of the optical instrument by using the angle adjustment mechanism of the optical instrument includes the following steps:

Step 1: Put the laser 6 into the mounting seat 2 from the open end 103 of the fine adjustment seat 1, and secure the mounting seat 2 through the laser pressing ring 7 at the open end 103. The emitted light of the laser 6 is emitted through the center hole on the end cover 102 of the fine adjustment seat 1;

Step 2: If the direction of the emitted light needs to be adjusted, insert the tapered fine adjustment screw 3 through the round hole 104 on the end cover 102 and put it into the fine adjustment seat 1, so that the tapered fine adjustment screw 3 overlaps with the strip-shaped plane 202 of the mounting seat 2. Then use a wrench to screw the tapered fine adjustment screw 3, and push the tapered fine adjustment screw 3 to move forward along the strip-shaped plane 202 of the mounting seat 2 abutting with conical surface of the tapered fine adjustment screw 3. The mounting seat 2 is squeezed and moves toward the spring pressing piece 402, and the arc-shaped protrusions 403 on the spring pressing pieces 402 abuts against the outer wall of the mounting seat 2 and limits the mounting seat 2 by elastic support;

Step 3: If the mounting seat 2 advances too much to shift the direction of the emitted light, turn the tapered fine adjustment screw 3 in the opposite direction to make the tapered fine adjustment screw 3 move back;

Step 4: Repeat step 2 and step 3, and repeatedly turn the tapered fine adjustment screw 3 to adjust the laser 6 in the mounting seat 2 horizontally and vertically until the direction of emitted light of the laser 6 reaches the preset requirement.

In summary, the angle adjustment mechanism of the optical instrument provided by the present disclosure adopts the way that the tapered surface of the tapered fine adjustment screw and the plane on the mounting seat overlap each other. When pushing the tapered fine adjustment screw, the tapered fine adjustment screw can advance or retreat along the plane on the mounting seat, and the speed of the forward and backward can be controlled, so that the laser angle can be precisely adjusted. This structure is especially suitable for the adjustment of the laser angle in the angle adjustment mechanism of the optical instrument with a small volume. By pushing the tapered fine adjustment screw to realize the small adjustment of the laser in the horizontal and vertical directions, then the adjustment of the left and right angle or the up and down angle of the laser is realized, so as to realize the adjustment of the angle of the emitted light.

The above examples are merely illustrative of the present disclosure, and do not constitute a limitation on the protection scope of the present disclosure. All designs identical or similar to the present disclosure fall within the protection scope of the present disclosure. The components and structures not described in detail in this embodiment belong to well-known components and common structures or common methods in the industry, and they will not be described here.

What is claimed is:

1. An angle adjustment mechanism of an optical instrument, comprising:
a hollow cylindrical fine adjustment seat, a hollow cavity of the fine adjustment seat being provided with two tapered fine adjustment screws and a mounting seat having a tapered surface, the tapered fine adjustment screws and the mounting seat being opposed to each other along an axial direction, the tapered surface of the mounting seat being provided with four strip-shaped planes evenly spaced in a circumferential direction, wherein two adjacent strip-shaped planes are overlapped with tapered surfaces of the two tapered fine adjustment screws, wherein each of the tapered fine adjustment screws can move forward or backward in a cavity formed by an inner wall of the fine adjustment seat and the tapered surface of the mounting seat along one of the strip-shaped planes that coincides with a corresponding tapered fine adjustment screw.

2. The angle adjustment mechanism of an optical instrument according to claim 1, further comprising a fine adjustment elastic member, the fine adjustment elastic member having a Π shaped structure or a Δ shaped structure formed by splicing an elastic arc elastic piece and two spring pressing pieces with arc-shaped protrusions, wherein the elastic arc elastic piece is clamped at a edge of one end of the fine adjustment seat, and the two arc-shaped protrusions of the two spring pressing pieces each abut on one of the strip-shaped planes.

3. The angle adjustment mechanism of an optical instrument according to claim 2, wherein the spring pressing pieces are each wave-shaped, a wave crest close to the elastic arc elastic piece having an arc-shaped protrusion, and each wave crest where the arc-shaped protrusion is located faces a central axis of the elastic arc elastic piece.

4. The angle adjustment mechanism of an optical instrument according to claim 3, wherein a cylindrical wall of the fine adjustment seat is provided with two strip openings which communicate with the hollow cavity along the axial direction, and wherein the arc-shaped protrusion of each of the spring pressing pieces passes through one of the strip openings and contacts one of the strip-shaped planes.

5. The angle adjustment mechanism of an optical instrument according to claim 4, wherein one end of the fine adjustment seat is open, and the elastic arc elastic piece is clamped to the open end, an other end of the fine adjustment seat is provided with an end cover, the end cover is provided with a round hole for each tapered fine adjustment screw, and a center of the end cover is provided with a center hole for emitted light.

6. The angle adjustment mechanism of an optical instrument according to claim 4, wherein the mounting seat comprises a circular truncated section, a cylindrical transition section and a drum section, the circular truncated section is with gradually increasing diameters from one end to the other end, the four strip-shaped planes are arranged on the tapered surface of the circular truncated section oppositely and in parallel in pairs, and wherein one of the strip-shaped planes is provided with a positioning hole.

7. The angle adjustment mechanism of an optical instrument according to claim 6, wherein a drum surface of the drum section is provided with a groove for accommodating a limiting member, and the limiting member is located between the drum section of the mounting seat and an inner wall of an open end of the fine adjustment seat.

8. The angle adjustment mechanism of an optical instrument according to claim 1, wherein each tapered fine adjustment screw is a hexagonal socket countersunk head conical screw.

* * * * *